J. STURROCK.
GRAIN DRILL.
APPLICATION FILED JAN. 22, 1912.
1,203,156.
Patented Oct. 31, 1916.
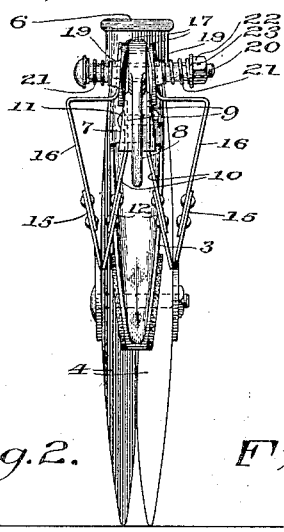
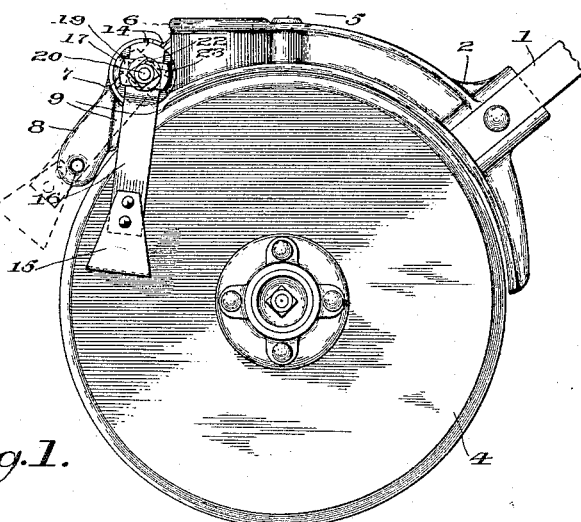
Fig. 2.   Fig. 1.
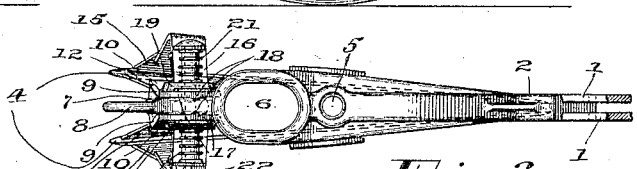
Fig. 3.
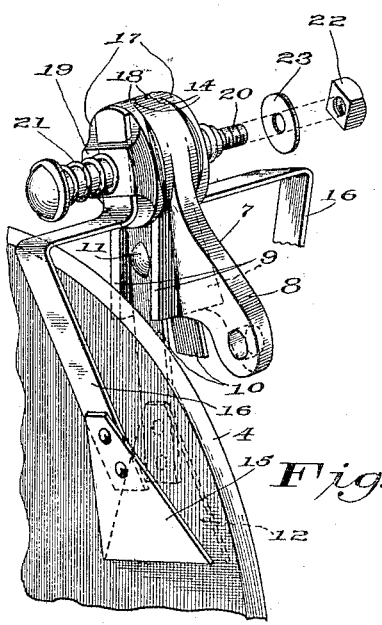
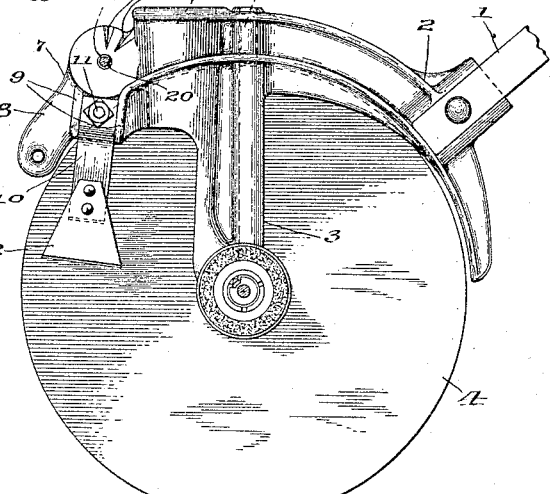
Fig. 5.   Fig. 4.
Witnesses:
C. C. Palmer
F. W. Hoffmeister
Inventor.
John Sturrock,
By E. W. Burgess
Attorney.

UNITED STATES PATENT OFFICE.

JOHN STURROCK, OF CHICAGO, ILLINOIS, ASSIGNOR TO INTERNATIONAL HARVESTER COMPANY OF NEW JERSEY, A CORPORATION OF NEW JERSEY.

GRAIN-DRILL.

1,203,156. Specification of Letters Patent. Patented Oct. 31, 1916.

Application filed January 22, 1912. Serial No. 672,697.

*To all whom it may concern:*

Be it known that I, JOHN STURROCK, a subject of the King of Great Britain, residing at Chicago, in the county of Cook and State of Illinois, have invented certain new and useful Improvements in Grain-Drills, of which the following is a specification.

My invention relates to grain drills, and has for its object to improve and simplify the construction and operation of a disk furrow opener employed therein. In carrying out this object I employ in connection with double disk furrow openers a pair of outside scraper bars mounted movably on a support, and means for locking the scrapers in position in engagement with the surfaces of the disks, which means are capable of yielding to permit a swinging movement of either one of the scrapers to a position outside of the periphery of the disks, and to be held in this position inoperative without in the least interfering with the operation of the other scraper.

In the use of this invention an operator may readily throw either one of the scrapers away from its disk, thereby to avoid the collection of trash on the scraper when working in certain soil conditions.

One form which my invention may assume is exemplified in the following description and illustrated in the accompanying drawing, in which—

Figure 1 represents a side elevation of a double disk furrow opener for a grain drill having my invention forming a part thereof; Fig. 2 is a rear elevation of Fig. 1; Fig. 3 is a top view of Fig. 1; Fig. 4 is a side elevation of Fig. 3, with one of the disks removed; and Fig. 5 is a perspective view of a fragmentary part of Fig. 1.

The same reference characters designate like parts throughout the several views.

1 represents drag bars having their rear ends secured to opposite sides of a forwardly extending arm 2 forming part of a disk support, having a vertically arranged leg portion 3 provided with means at its lower end whereby rotatable disks 4 may be connected therewith in a manner to incline toward each other relative to the line of draft of the machine, a vertically arranged oil duct 5 leading from the top of the support and communicating with the journal bearings for the disks in any preferred manner, a short vertically arranged tube 6 in rear of said oil duct adapted to receive a grain conveying tube communicating with the distributing mechanism of a grain drill, and a rearwardly extending arm 7, the arms 2 and 7 being arranged approximately concentric with the axes of the disks. Arm 7 is provided with a downwardly and rearwardly inclined ear member 8 having raised rib portions 9 spaced apart and upon opposite sides of said ear member in a manner to receive between said ribs plate spring members 10, the spring members being secured between said ears by means of a single bolt 11.

12 represents scraper blades secured to the lower ends of the plate spring members and adapted to engage with the inner surfaces of the adjacent disks. The arm 7 is provided with circular bearing surfaces upon opposite sides thereof, immediately in rear of the tube 6 and surrounding a central opening 13 through the arm, and 14 represents V-shaped radially arranged cavities formed in the surfaces.

15 represents scraper blades engaging with the outside surfaces of the disks, said blades being secured to the lower ends of scraper holding arms 16 that incline upward and outward and then directly inward in a horizontal plane above the disks, and then vertically, the vertical portions thereof being received by circular button members 17, having flat inner surfaces adapted to engage with the circular bearing surface upon the arm 7, and V-shaped raised portions 18 adapted to be received by the cavities formed in the adjacent bearing surfaces. The buttons are also provided with outwardly extending loop members 19, the walls thereof engaging with the scraper holders, the loop members having openings therein that register with openings in the vertical portion of arm 16, and with the opening 13 in the arm 7 and adapted to receive the bolt 20. 21 represents compression springs surrounding opposite ends of the bolt and operative between the head of the bolt upon one side of the arm and the adjacent button, and a nut 22 and washer 23 upon the opposite side of the arm and the adjacent button in a manner to yieldingly retain the buttons and scraper holders in engagement with said arm.

When the condition of soil is such as to make the use of scrapers for cleaning the outside surfaces of the disks unnecessary, the scraper holding arms 16 may be readily turned upward and rearward, as shown by dotted lines in Fig. 1, in a manner to remove the scraper blades from engagement with the disks.

While I have illustrated and described but one form of my invention, it is to be understood, nevertheless, that it is susceptible of modifications, and, therefore, many changes may be made in the construction and arrangement of the several parts without departing from the spirit of the invention as disclosed in the appended claims.

What I claim as my invention, and desire to secure by Letters Patent, is:

1. In a double disk furrow opener, a disk support, disks rotatably mounted upon opposite sides thereof, a plurality of scrapers disposed on opposite sides of said support engageable with the surfaces of said disks, a bolt extending transversely through the ends of said scrapers and said support to permit angular movement of said scrapers, coiled springs carried on said bolt, and locking connections intermediate said coiled springs and said support for locking said scrapers against rotative movement with respect to the latter.

2. In a double disk furrow opener, a disk support, a disk rotatably mounted on one side thereof, a scraper disposed on one side of said support engageable with the surface of said disk, a bolt extending transversely through the upper end of said scraper and said support to permit rotative movement of said scrapers, a coiled spring carried on said bolt, a spring-pressed member carried on said bolt operatively connected to the end of said scraper and located intermediate said spring and said support, and coöperating means on said member and said support coöperating with said spring normally to position said member and said scraper against rotative movement with respect to said support.

3. In a double disk furrow opener, a pair of rotatable disks, outside scrapers therefor, a scraper supporting member, and bars for the scrapers mounted on said support in a manner to permit an equalizing movement of the scrapers against the disks, said bars being capable of independent movement to permit one of said scrapers to be removed from its disk without disturbing the operation of the remaining scraper.

4. In a double disk furrow opener, a pair of rotatable disks, an outside scraper for each of said disks, a supporting member for said scrapers, a connection between the scrapers and support to permit either scraper to be moved away from its disk and held in such position, and means for automatically locking said scrapers in position against the disks when they are moved to operative position.

5. In a disk furrow opener, a rotatable disk, a scraper therefor, a support to receive said scraper, a connection between said scraper and support permitting movement of the former longitudinally of the disk whereby the scraper may be swung to position outside the periphery of the disk, and means for automatically locking said scraper in position in engagement with the surface of the disk when it is moved within the periphery thereof.

JOHN STURROCK.

Witnesses:
A. L. JOHNSON,
P. H. SHEA.